(Model.)

F. G. BOTSFORD.
HOSE.

No. 438,836. Patented Oct. 21, 1890.

UNITED STATES PATENT OFFICE.

FREDERICK G. BOTSFORD, OF ERIE, PENNSYLVANIA, ASSIGNOR OF THREE-FOURTHS TO JOSIAH N. HURST, OF WEST DOVER, OHIO, AND CLARENCE M. BRYANT, OF BUFFALO, NEW YORK.

HOSE.

SPECIFICATION forming part of Letters Patent No. 438,836, dated October 21, 1890.

Application filed February 2, 1889. Serial No. 298,482. (Model.)

*To all whom it may concern:*

Be it known that I, FREDERICK G. BOTSFORD, a citizen of the United States, residing at Erie, in the county of Erie and State of Pennsylvania, have invented a new and useful Improvement in Flexible Hose-Tubes, of which the following is a specification.

This invention relates to an improvement in flexible hose, and more especially to the rubber or cloth hose which is employed for connecting the steam or heating pipes of railway-cars. The heat and condensed steam passing through these flexible pipes in process of time cause the hose to crack and decay prematurely, forming rents in the hose, which allow the steam or hot air to escape.

The object of my invention is to produce a cheap, reliable, and durable hose which will resist the deteriorating action of steam and heat; and it consists to that end of a flexible hose having an interior lining of cork.

Figure 1:
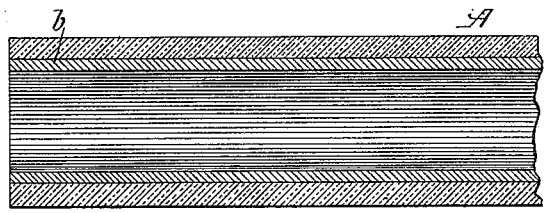
Figure 2:
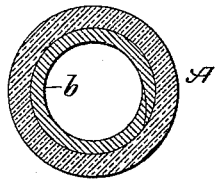
Figure 3:
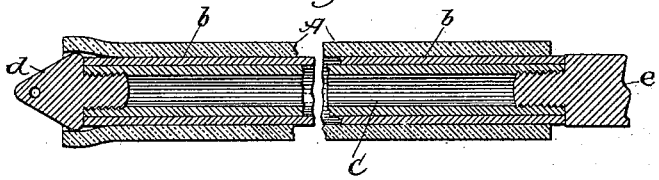

In the accompanying drawings, Figure 1 is a longitudinal section of a piece of my improved hose. Fig. 2 is a cross-section of the same. Fig. 3 is a longitudinal section showing the manner of applying the cork lining to the hose.

Like letters of reference refer to like parts in the several figures.

A represents the body of a flexible hose, which may be constructed of rubber, cloth, or any other suitable material. $b$ is the lining of cork arranged within the hose and covering the entire inner surface thereof. The cork lining, which is impermeable to water and a non-conductor of heat, protects the interior of the hose from the action of the heat and the hot water of condensation, thereby preventing cracking and rapid decay of the body of the hose and avoiding leakage. In applying the cork lining to the hose a thin sheet of cork is rolled into a tube of the proper diameter to fit into the bore of the hose, the ends of the cork being beveled or chamfered and cemented together. The tube so formed is placed upon a mandrel or cylindrical carrier C, having at one end a conical head $d$ of somewhat larger diameter than the body of the mandrel, and at its opposite end a removable head or enlargement $e$ of cylindrical form, the tube of cork being confined between the two heads of the mandrel, as shown in Fig. 2. The mandrel, with the cork tube, is inserted into the bore of the hose with its tapering head foremost, the latter distending the hose and protecting the front end of the cork, and the cylindrical rear head $e$ is then removed from the mandrel and the latter withdrawn from the cork tube by means of its conical head, leaving the lining in the hose. The withdrawal of the mandrel permits the hose to contract, and thus retains the lining in place. If desired, the rubber hose may be molded around the cork tube forming the lining.

Instead of a single continuous cork tube, several gaskets or tubular sections of cork may be arranged end to end in the external flexible tube to form the lining.

My improved flexible hose is particularly desirable for connecting the steam and heating pipes of railway-cars; but it is also useful for many other purposes.

I claim as my invention—

1. A compound hydraulic hose consisting of an external flexible tube and an internal lining of sheet-cork rolled into tubular form and applied in said tube, substantially as set forth.

2. A compound hydraulic hose consisting of an internal tube of sheet-cork having its chamfered longitudinal edges cemented together and an external flexible tube, substantially as set forth.

Witness my hand this 22d day of January, 1889.

FREDERICK G. BOTSFORD.

Witnesses:
  CARL F. GEYER,
  JNO. J. BONNER.